US006982780B2

(12) United States Patent
Morley et al.

(10) Patent No.: US 6,982,780 B2
(45) Date of Patent: Jan. 3, 2006

(54) APPARATUS AND METHOD FOR BUILDING A PLAYLIST

(75) Inventors: Steven A. Morley, Escondido, CA (US); Jesse Hose, Carlsbad, CA (US); Michael Mitrani, San Diego, CA (US); Jason Reich, San Diego, CA (US)

(73) Assignee: Technicolor Digital Cinema, LLC, Burbank, CA (US)

( * ) Notice: Subject to any disclaimer, the term of this patent is extended or adjusted under 35 U.S.C. 154(b) by 0 days.

(21) Appl. No.: 09/798,361

(22) Filed: Mar. 2, 2001

(65) Prior Publication Data

US 2002/0122154 A1 Sep. 5, 2002

(51) Int. Cl.
*G03B 19/18* (2006.01)
*G06F 13/00* (2006.01)
(52) U.S. Cl. .......................................... 352/38; 725/37
(58) Field of Classification Search ................ 352/5, 352/11, 31, 38; 345/716–723; 725/32, 37, 725/39, 44, 45, 47, 55, 116, 145
See application file for complete search history.

(56) References Cited

U.S. PATENT DOCUMENTS

| 5,404,316 | A | * | 4/1995 | Klingler et al. ............. 345/418 |
| 5,798,818 | A | | 8/1998 | Derderian et al. ............. 352/31 |
| 5,818,941 | A | | 10/1998 | Embree ........................ 381/22 |
| 5,861,880 | A | * | 1/1999 | Shimizu et al. .............. 345/723 |
| 5,892,535 | A | * | 4/1999 | Allen et al. .................. 345/716 |
| 6,141,530 | A | | 10/2000 | Rabowsky ................... 725/116 |
| 6,424,998 | B2 | * | 7/2002 | Hunter ........................ 705/26 |
| 6,441,832 | B1 | * | 8/2002 | Tao et al. .................... 345/723 |

OTHER PUBLICATIONS

"iMovie" product literature, http://apple.com/imovie, Oct. 12, 1999.*

* cited by examiner

*Primary Examiner*—Rodney Fuller
(74) *Attorney, Agent, or Firm*—Joseph S. Tripoli; Joseph J. Laks; Robert B. Levy

(57) ABSTRACT

In a digital cinema system, a method for creating a playlist is claimed. At least one image program and at least one audio program is displayed. Each image program comprises encoded data representing image information, and each audio program comprising encoded data representing audio information. Responsive to image programs and audio programs being specified, compatibility of selected image programs and selected audio programs is verifying.

54 Claims, 12 Drawing Sheets

APPARATUS AND METHOD FOR BUILDING A PLAYLIST

BACKGROUND OF THE INVENTION

I. Field of the Invention

The present invention relates to digital cinema. More specifically, the present invention relates to an apparatus and method for creating a playlist in a digital cinema system.

II. Description of the Related Art

In the traditional film industry, theatre operators receive reels of celluloid film from a studio or through a distributor for eventual presentation in a theatre auditorium. The reels of film include the feature program (a full-length motion picture) and a plurality of previews and other promotional material, often referred to as trailers. The theatre operator may also be required or choose to present some its own trailers, often comprising of local promotional and advertising material.

For presentation, a theatre operator builds a "platter", or playlist. This involves sequencing reels of celluloid film in the order in which it is to be presented, and physically splicing together the film to be played by the projector. In between trailers, or between a trailer and the feature, it is sometimes desirable to display a "black screen". A black screen is several seconds of blank film, which provides for a transition and somewhat of a dramatic affect between different trailers or features. To create a black screen, the theatre operator physically splices blank film into the desired areas in the same manner as trailers are put together.

A theatre operator also inserts cues and milestones onto celluloid film by physically attaching trigger strips onto the film. Cues may be attached in between programming, or within a particular feature or trailer. Currently, a theatre operator controls auditorium environment through the use of a theatre automation systems. Theatre automation systems control such functions as turning lights on and off, opening and closing curtains, and changing the projector lens. Theatre automation systems control these functions by reading a trigger strip physically placed onto the film as the film passes through a reader connected to the theatre automation system. Trigger strips are typically metallic or optical pieces of tape adhered onto the film. When the tape passes under the reader, an electrical signal is output to the theatre automation system. There are many theatre automation systems available and no uniform way in which theatre automation systems operate. That is, where a trigger strip is placed relative to a frame on the film will cause different theatre automation systems to behave differently. For example, a trigger strip may be placed on a left edge of the film, called an inboard cue, the center of the film, called a center cue, or the right edge of the film, called an outboard cue. Other theatre automation systems interpret only a single trigger strip regardless of where the trigger strip is placed relative to a frame on the film, or mandate in what position the strip must be placed (inboard, center, or outboard) in order to be read. Further still, other theatre automation systems attach meaning to combinations or sequences of trigger strips.

If a theatre operator wants to insert a cue during a presentation of a program, as studios sometimes mandate, the operator must physically look at the frames on the reel of film to determine where the cue should be inserted. Alternatively, the operator may estimate where a trigger strip should be placed by knowing that "x" number of feet of film is equal to about "y" seconds during presentation. For example, a "lights on" cue may be inserted ten seconds after the credits begin. The theatre operator would then physically attach the metallic or optical strip onto the proper place on the film by estimating how many feet of film translates into a ten second delay.

Trailers and features each have associated ratings, which define the appropriateness of the material for a given audience. In the United States, ratings are labeled to motion pictures and trailers by the Motion Picture Association of America (MPAA). However, different jurisdictions have different ratings systems, and not all jurisdictions are consistent as to the rating level of a given program. Accordingly, a theatre operator in a given jurisdiction need be conscious of the types of programs he plans to display together.

Moreover, trailers and features are filmed using a specific display aspect ratio. The display aspect ratio refers to how the image was filmed and how the studio wants the image to be displayed. Typically, images are presented on projectors using either a scope lens or a flat lens. The cinema scope has a ratio of 2.35:1 and a flat lens has a ratio of 1:85:1. The ratio refers to the horizontal plane versus the vertical plane from the size the image is projected onto the screen. Further, various projectors are sensitive to the type of scanning or chroma sampling.

Along with reels of films comprising features and trailers, the theatre operator receives one or more soundtracks to be played with each film. Soundtracks come in a variety of languages and sound formats. Sound formats, such as stereo, 7.1, or 5.1, refer to the number of channels the sound format requires. Because sound systems vary greatly from theatre to theatre, the studio or distributor typically ship multiple soundtracks for a given film.

When a theatre operator is building a platter or playlist, the operator must be careful to ensure that the playlist is created accurately. For example, each image program should have the appropriate soundtrack loaded, in terms of language and sound format. Moreover, the image programs on the platter should have the appropriate ratings. That is, one wants to ensure that an "R" rated trailer is not displayed with a "G" rated movie. Further, cues must be inserted in the proper places and the correct lens needs to be attached to the projector in order for viewing at the proper display aspect ratio. However, human error is inevitable and all too frequent.

Further, an evolution of the film industry is occurring as the industry moves from celluloid film to digitized image and audio programs. Theatres are not equipped to process digital programming to create "digital platters."

SUMMARY OF THE INVENTION

With the advent of Digital Cinema systems, full-length motion pictures, trailers, advertisements and other audio/image "cinema-quality" programs are delivered to theatres throughout the world using digital technology. Digital Cinema systems deliver motion pictures that have been digitized, compressed and encrypted to theatres using either physical media distribution (such as DVD-ROM's) or electronic transmission methods, such as satellite.

Authorized theatres automatically receive the digitized programs and store them, typically while still encrypted and compressed. At each showing, the digitized information is retrieved via a local area network from the storage medium, then is decrypted, decompressed and displayed using cinema-quality electronic projectors featuring high quality digital sound.

Accordingly, an apparatus and method for creating a playlist, or a digital platter, in a digital cinema system is described. Specifically, a method for creating a playlist comprises displaying at least one image program and at least one audio program. Each image program comprising encoded data representing image information and each audio program comprising encoded data representing audio information. Responsive to image programs and audio programs being specified, compatibility of the selected image programs and the selected audio programs is verified. In an embodiment, the method may also comprise linking the specified audio program to the specified image program to form a selected program, and sequencing the selected programs in the order which presentation is desired.

In another embodiment, an insert such as a cue, an embedded cue, and a black screen may be inserted in the playlist and sequenced. In yet an embodiment, the selection of audio programs is limited to a subset of audio programs, where each subset of audio programs is based on each image program selected.

Each image program and each audio program may have associated indicators, such as a ratings indicator, an aspect ratio indicator, a scanning indicator, a chroma sampling indicator, a language indicator, an audio format indicator and a ratings indicator, and a projector lens indicator. A warning indicative of incompatibility may be displayed if a mismatch situation occurs.

In an apparatus of an embodiment, a playlist builder is configured to build a playlist comprising of image and audio programs. In another embodiment, cues and black screens are also in the playlist. Each image and audio program may comprise an indicator. A compatibility checker is electrically connected to the playlist builder, the and configured to verify compatibility of the image and audio programs by comparing the indicators from the image and audio programs. Indicators include a ratings indicator, an aspect ratio indicator, a scanning indicator, and a chroma sampling indicator, a language indicator, and an audio format indicator. Upon verification, a selected program is created. In an embodiment, the playlist builder may further comprise a sequencer configured to sequence selected programs, cues and black screens in the order in which presentation is desired. In yet another embodiment, a scheduler is electrically connected to the playlist builder and configured to schedule the verified playlist for presentation at a specified time and place.

Accordingly, it is an aspect of an embodiment to avoid a ratings mismatch between different image programs.

It is another aspect of an embodiment to avoid aspect ratio mismatches between image programs.

It is another aspect of an embodiment to avoid language mismatches between selected audio programs.

It is another aspect of an embodiment to avoid a projector mismatch.

It is another aspect of an embodiment to avoid mismatches between audio programs.

It is another aspect of an embodiment to allow for convenient and accurate input of cues and offset cues, and to be able to reference cues on an event basis.

It is another aspect of an embodiment to enable a user to easily sequence programming material.

It is another aspect of an embodiment to limit the selection of audio programs to that of a selected image program.

It is another aspect of an embodiment to interface with existing theatre automation systems.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein:

FIG. 4 illustrates a window showing a list of image programs;

FIG. 5 illustrates a window showing details of a selected program;

FIG. 11 illustrates a window showing a warning indicative of incompatibility due to a ratings mismatch.

DETAILED DESCRIPTION OF THE DRAWINGS

Figure 1:
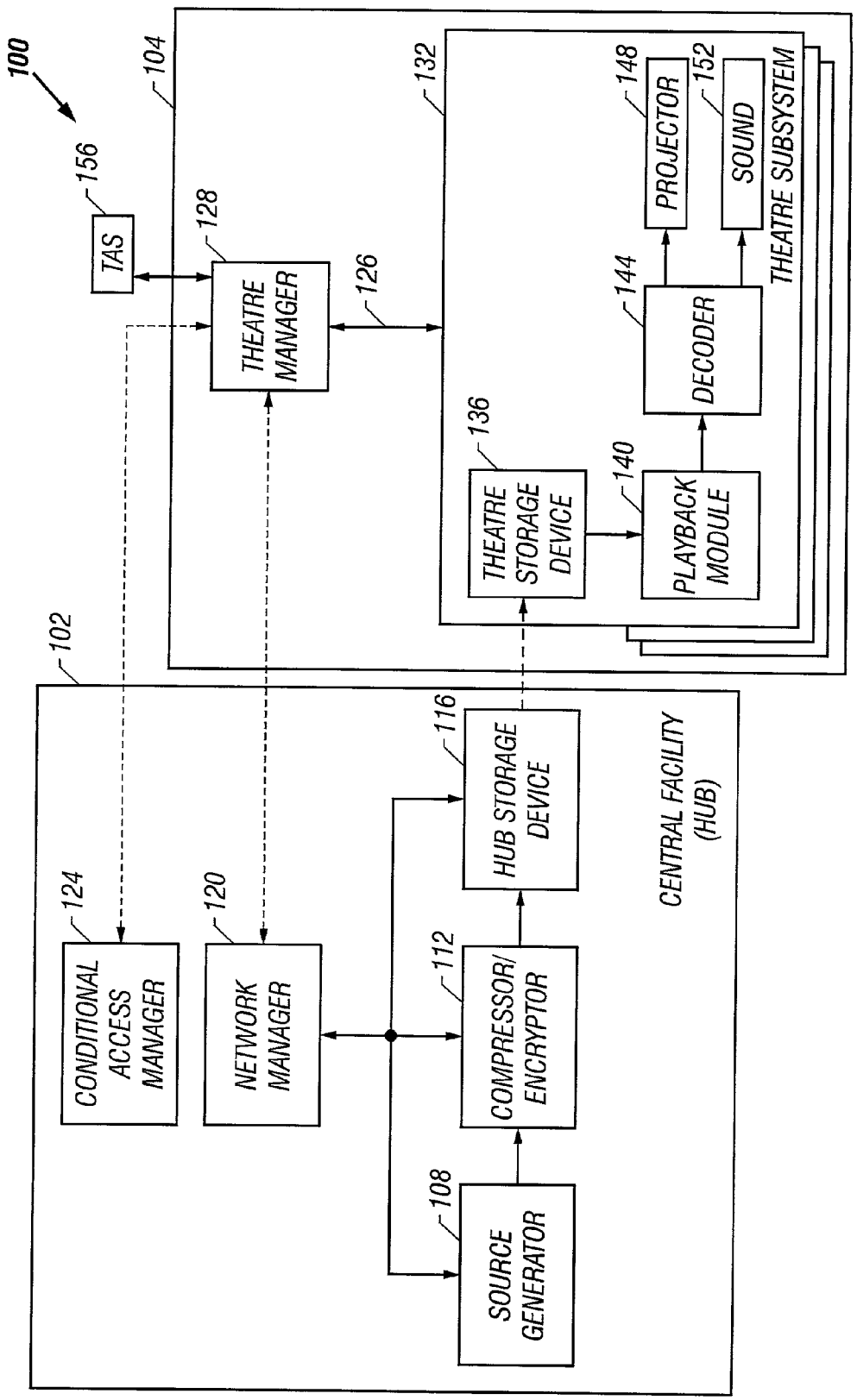
FIG. 1 illustrates a block diagram of a digital cinema system.

A digital cinema system 100 is illustrated in FIG. 1. The digital cinema system 100 comprises two main systems: at least one central facility or hub 102 and at least one presentation or theatre subsystem 104. The hub 102 and the theatre subsystem 104 are of a similar design to that of pending U.S. patent application Ser. No. 09/075,152 filed on May 8, 1998, entitled, "Apparatus and Method for Distribution of High Quality Image and Audio Programs to Remote Locations," and pending U.S. patent application Ser. No. 09/564,174, filed May 3, 2000, entitled, "Apparatus and Method for Encoding and Storage of Digital Image and Audio Signals," and pending U.S. patent application Ser. No. 09/563,880, filed May 3, 2000, entitled, "Apparatus and Method for Decoding Digital Image and Audio Signals," all assigned to the same assignee as the present invention, and are incorporated by reference herein.

In an embodiment, image and audio information are compressed and stored on a storage medium, and distributed from the hub 102 to the theatre subsystem 104. Generally, one theatre subsystem 104 is utilized for each theatre or presentation location in a network of presentation locations that is to receive image or audio information, and includes some centralized equipment as well as certain equipment employed for each presentation auditorium.

In the central hub 102, a source generator 108 receives film material and generates a digital version of the film. The digital information is compressed and encrypted by a compressor/encryptor (CE) 112, and stored on a storage medium by a hub storage device 116. A network manager 120 monitors and sends control information to the source generator 108, the CE 112, and the hub storage device 116. A conditional access manager 124 provides specific electronic keying information such that only specific theaters are authorized to show specific programs.

In the theatre subsystem 104, a theatre manager 128 controls one or multiple auditorium subsystems 132. The theatre manager 128 controls loading, building a playlist, and controlling and monitoring presentation of image and audio information. The theatre manager may also maintain a history of image and audio programs presented. In an embodiment, each theatre manager may comprise of many auditorium managers, based on the number of auditoriums in a given theatre. In such cases, each auditorium manager controls loading, building a playlist, controlling and monitoring presentation, and maintaining a history of its respective auditorium. Each auditorium manager also interfaces with existing theatre automation systems (TAS) 156 for control of environmental functions.

Based on control information received from the theatre manager 128, a theatre storage device 136 transfers compressed information stored on the storage medium to a playback module 140. The playback module 140 receives the compressed information from the theatre storage device 136, and prepares the compressed information to a predetermined sequence, size and data rate. The playback module 140 outputs the compressed information to a decoder 144. The decoder 144 inputs compressed information from the playback module 140 and performs decryption, decompression and formatting, and outputs the image and audio information to a projector 148 and a sound module 152. The projector 148 plays the image information and the sound module 152 plays sound information on a sound system, both under control of the theatre manager 128.

Figure 2:
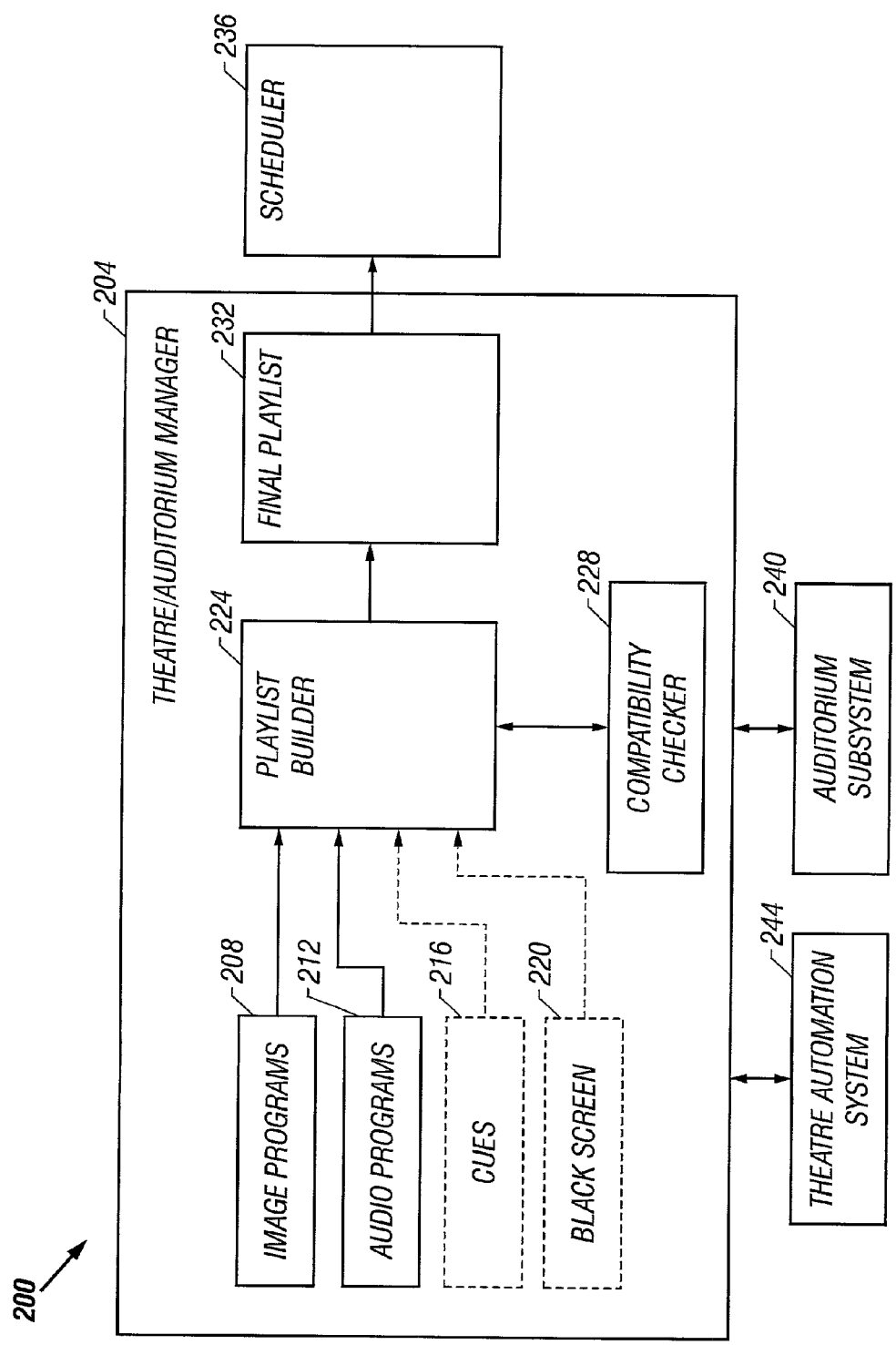
FIG. 2 illustrates a theatre manager and its associated interfaces.

FIG. 2 illustrates a block diagram 200 of the theatre or auditorium manager 204 and its interfaces. The auditorium manager 204 comprises of lists or databases of image programs 208 and audio programs 212. The auditorium manager may also comprise user definable or lists of cues 216 and black screens 220. A playlist builder 224 is configured to allow a user to build a playlist. The playlist builder 224 is configured to interface with a compatibility checker 228 to avoid mismatching. Upon successful compatibility, a final playlist 232 is created. The final playlist is configured to interface with a scheduler 236, which is configured to schedule final playlist 232 for presentation in a designated auditorium at a designated time. Upon playback through an auditorium subsystem 240, the auditorium manager 204 interfaces with an existing theatre automation system 244 as necessary for environmental control.

Figure 3:
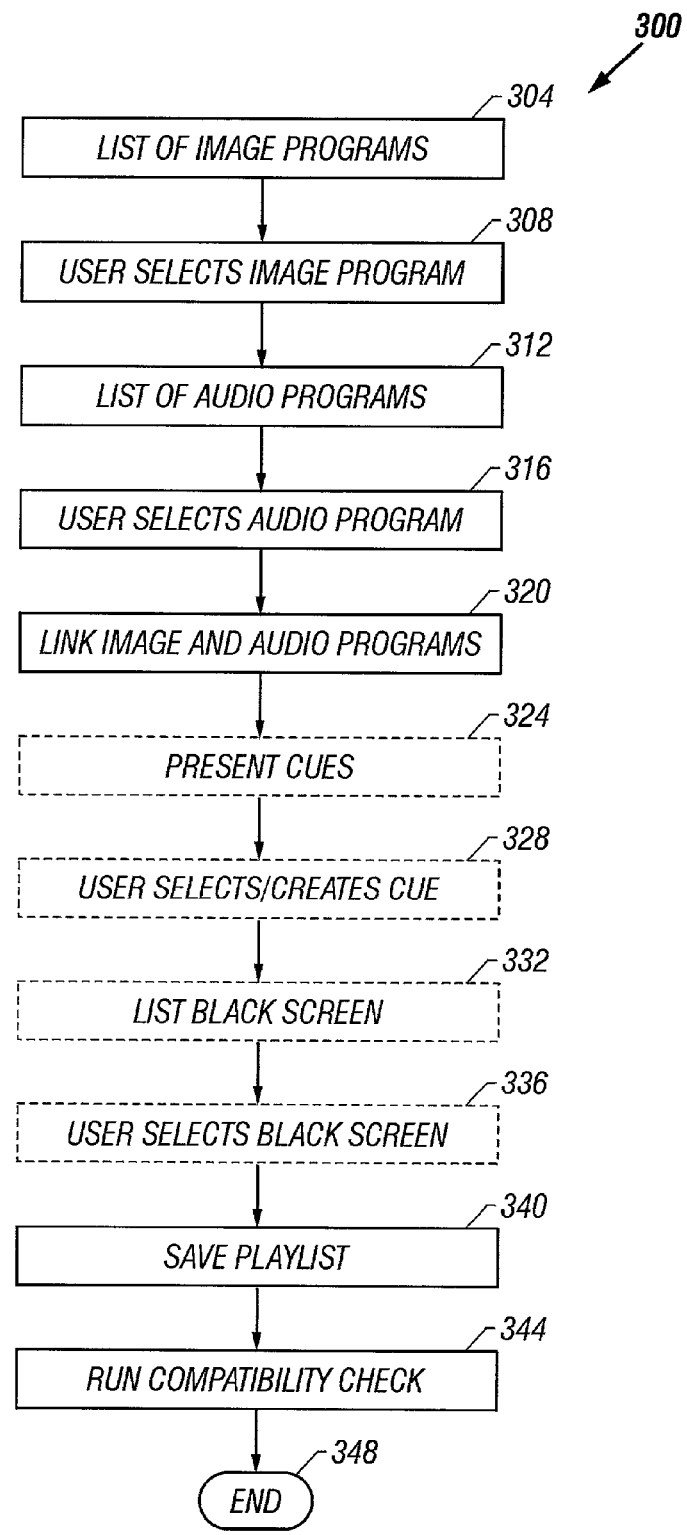
FIG. 3 illustrates a flowchart of the process of creating a playlist.

FIG. 3 illustrates a flowchart of the process in which the theatre manager or auditorium manager may create a playlist 300. In operation, a list of image programs are displayed to the user 304. In an embodiment that is described in further detail with respect to FIG. 4, a separate "select program" window is presented. The list of image programs 304 comprise feature programs, such as motion pictures, and trailer programs, which are typically credits, previews or other promotional or advertisement information. Slides, black screens and other image programs may also be listed.

Once a user selects an image program into the playlist (308), a list of available audio programs, or soundtracks, is presented (312). In an embodiment that is described in further detail with respect to FIG. 7, a separate "select sound sets" window is presented. The list of available audio programs 312 presented may be limited to those compatible with the selected image program 308. The user then selects (316) the audio program to be associated with the selected image program. If only one audio program is available for the selected image program, the audio program is automatically selected. The selected audio program 316 may then be linked (320) with the selected image program 308. The user then may select additional image programs 304 and associated audio programs 312 to build the playlist.

The user may also be presented with a list of cues 324. In an embodiment that is described in further detail with respect to FIG. 8, a separate "cue properties" window is presented. When a cue is selected (328), the playlist saves a command executable at a predetermined time that sends a signal to an existing theatre automation system to control the auditorium environment. Aspects that may be controlled include turning on or off theatre lights, opening or closing curtains, or adjusting masking. Masking refers to short curtains on each side of a screen that frame the screen, so that the projected image fits nicely onto the screen within the masking. Cues may also dictate the type of projector or the projector lens. Currently, projectors have multiple lenses that may change from a flat lens to a scope lens. Cues may also control the type of audio system being used. In another embodiment, the cues generated may control many types of theatre automation systems.

A user may also wish to insert a black screen 332. If so, the user selects an insert black screen icon and an insert black screen window is presented. Details are described herein with respect to FIG. 10. The user may then select the length of time for the black screen to be displayed (336).

The user can select to save the platter or playlist to 340 at any time. This initiates a compatibility check process 344. In an embodiment that is described in further detail with respect to FIG. 11, a warning indicative of incompatibility window is presented. A warning is issued when indicators such as ratings, aspect ratio, language, audio format, scanning, projector lens, and chroma sampling are mismatched. Upon successful completion of the compatibility check process, the playlist is created and the process ends 348. The created playlist, or digital platter, may then be scheduled for later viewing.

In an alternate embodiment, a user may be presented with a single list of image and audio programs. The user then may select any combination of image and audio programs into the playlist. In yet another embodiment, the user may initiate "select program", "select sound sets", "select cue", "select offset cue" and "select black screen" windows by selecting an icon. The user may select an icon using any standard user input device, such as a keyboard, mouse, touchscreen, or voice commands.

In yet another embodiment, the compatibility check process 344 may occur at any point where compatibility may be an issue. For example, upon selection of multiple image and audio programs, compatibility with respect to language, sound format, cues or projector requirements may be run.

In another embodiment, the playlist builder is a computer readable medium containing instructions for controlling a computer system to display at least one image program and at least one audio program, each image and audio program comprising encoded data representing image information. The computer readable medium also verifys the compatibility of the selected image programs and the selected audio programs.

In another embodiment, the playlist builder is a computer program product comprising a computer usable medium having computer readable code embodied therein for creating a playlist. The computer usable medium comprises means for displaying at least one image program and at least one audio program, each image and audio program comprising encoded data representing image information. The computer program product also comprises means for verifying the compatibility of the selected image programs and the selected audio programs.

In another embodiment, the playlist builder is a memory for storing data for access by a process being executed by a processor. The memory comprises a structure for maintaining information on creating a playlist of digitized image and audio programs. The memory also comprises an indicator that indicates compatibility of the image program and audio programs.

Figure 4:
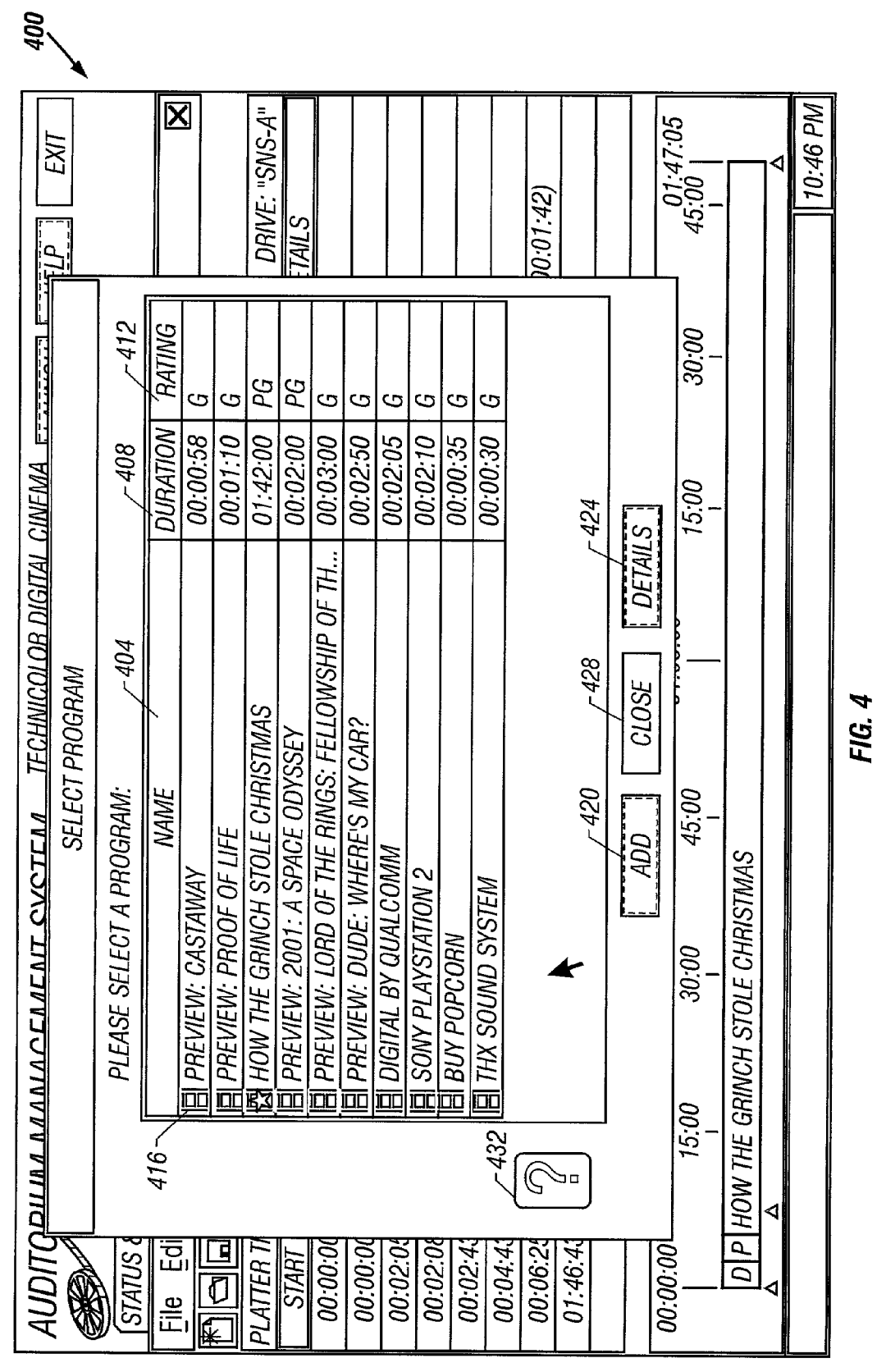

FIG. 4 illustrates a window displaying a list of image programs 400. In an embodiment, the list of programs comprise a name field 404, a duration field 408, and a ratings field 212. Those skilled in the art will recognize that additional fields regarding program attributes may also be listed, such as aspect ratios or designations indicative of the type of image program, such as feature, trailer, or advertisement. The display may also comprise an indicator field 416 showing whether a program has been selected. The name field 404 provides for the name of the image program and, optionally, a descriptive reference. The duration field 408 indicates the length of time needed for the image program to be presented at a normal operational rates of speed. It should be noted that an audio program need not exist, or be played with, an image program.

The rating field 416 indicates the rating of the program. The rating 412 defines the appropriateness of the material for a given audience. In the United States, ratings are labeled to motion pictures and trailers by the Motion Picture Association of America (MPAA). However, different jurisdictions have different rating systems. Accordingly, the ratings field 412 may be altered given a given jurisdiction's ratings scheme.

The window of image programs 400 may also comprise an add button 420 and a details button 424. If the user selects the add button 420, the selected program is selected and added to the playlist. A separate playlist window may be created upon selecting a program. Selection of the details button 424 initiates a program details window, which provides additional and more specific information about the selected image program. The program details window is described in greater detail with respect to FIGS. 5 and 6. A close button 428 closes the select programs screen 400. Also, a help button 432 may be provided to further assist a user in the selection process.

Figure 5:
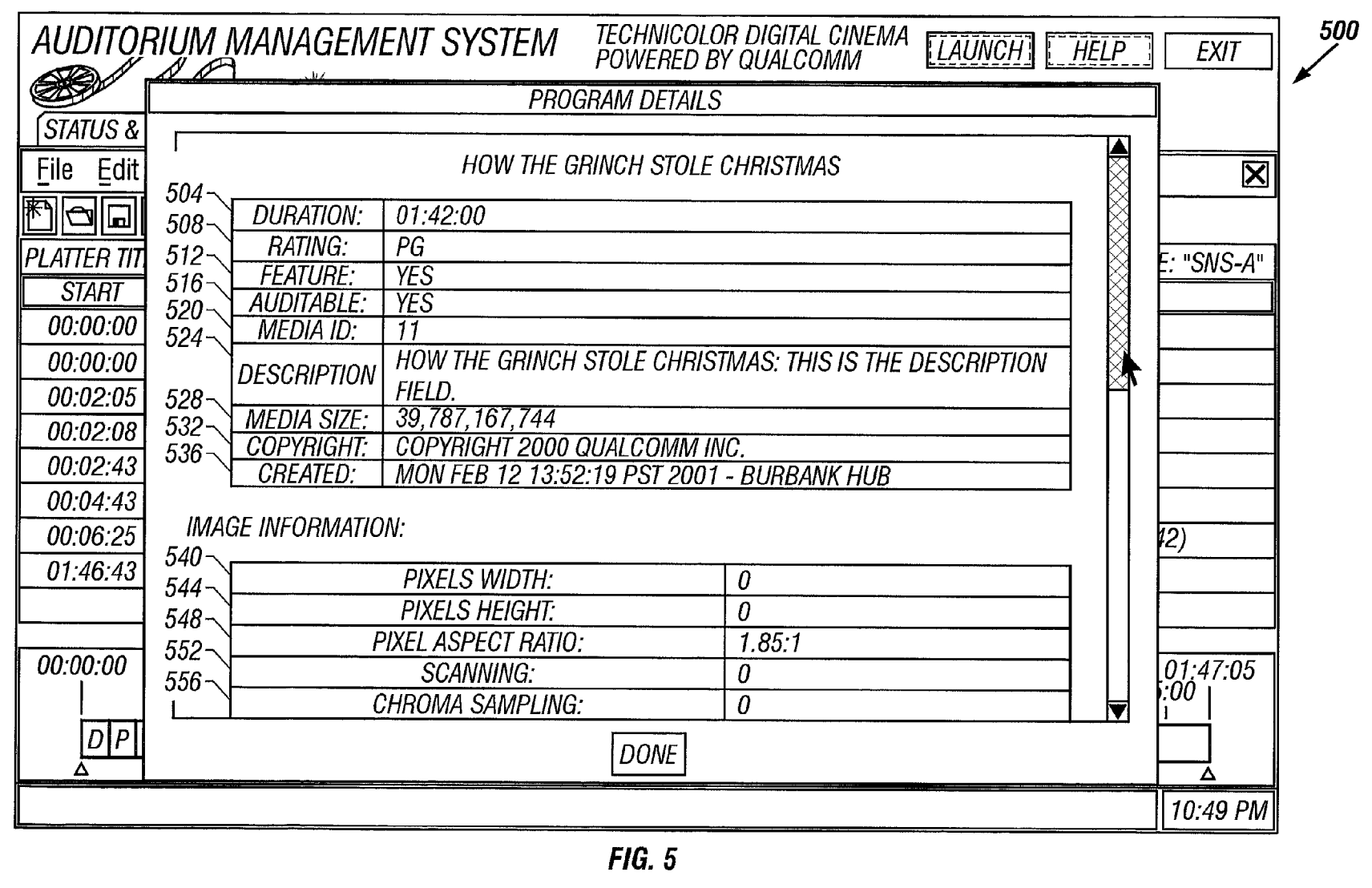
Figure 6:
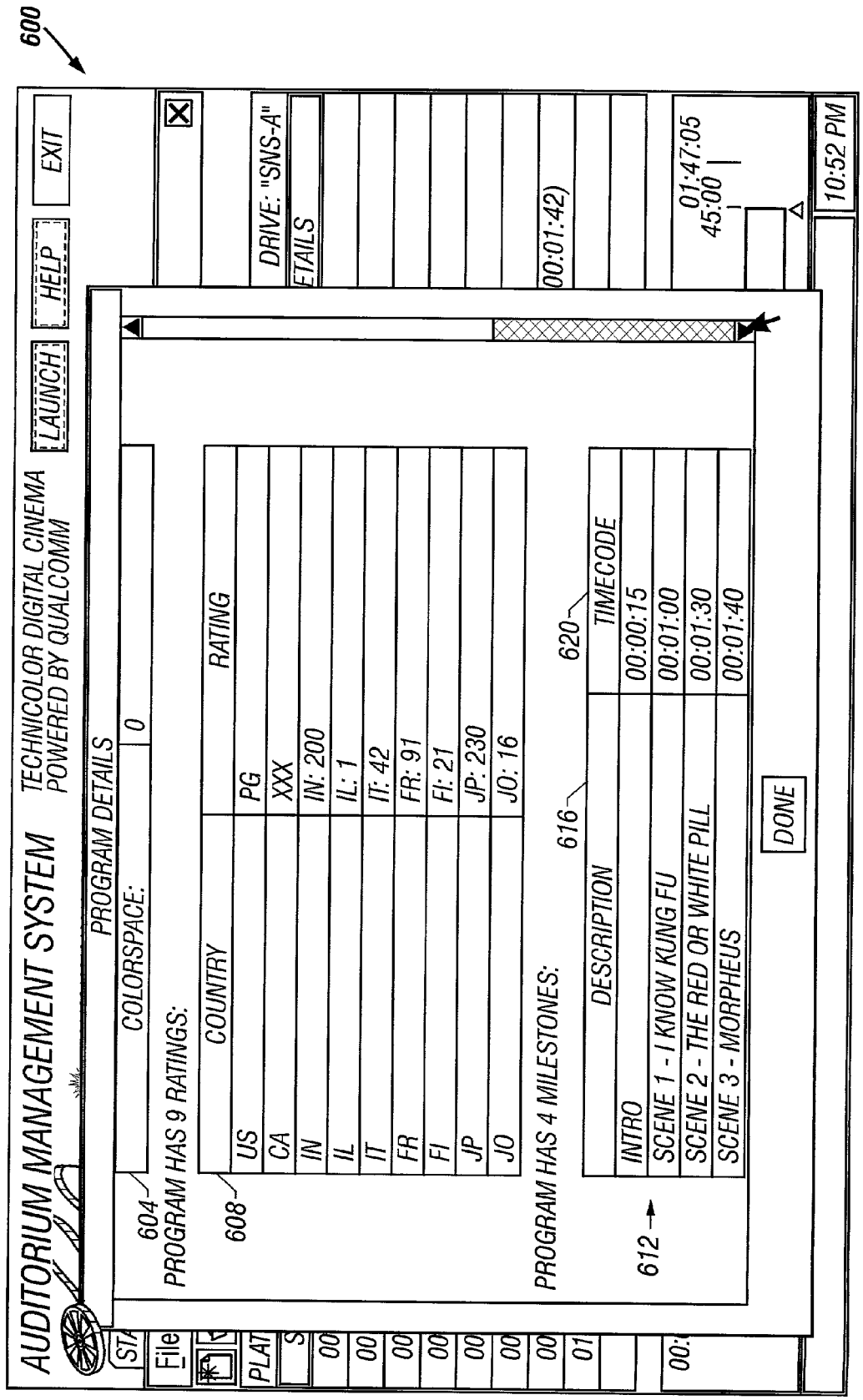
FIG. 6 is a continuation of FIG. 3, illustrating additional features of a selected program.

If a user selects the details button 424, a program details window 500 is launched, which is illustrated in FIGS. 5 and 6. The program details window 500 may have a number of fields that further describe any given image program. Typically, the settings in the various fields of the details window originate from the media descriptor files, or meta data files. Fields may include a duration field 504, a ratings field 508, a feature field 512, an auditable field 516, a media identification field 520, a description field 524, a media size field 528, a copyright field 532, and a created field 536. The auditable field 516 refers to program that maintains a history of which programs were played at given times and auditoriums. In an embodiment, the field is configurable such that the user may activate or inactivate this function. The media identification field 520, or program distribution identifier, refers to a unique identifier for a given image or audio program. The media size field 528 refers to the size, in bytes, of the selected program. The copyright field 532 indicates the owner of the copyright for the selected program. The created field 536 refers to the time and place the digitized program was created.

The program details screen may also include additional image information, ratings information, and milestone information. Additional fields include a pixel width field 540, a pixel height field 544, a pixel aspect ratio field 548, a scanning field 552, a chroma sampling field 556, and a color space field 604 (shown in FIG. 6). The pixel width field 540 refers to the number of pixels along a horizontal dimension of the image program. The pixel height field 544 refers to the number of pixels along a horizontal dimension of the image program. The pixel aspect ratio field 548 refers to ratio of the pixel width and pixel height.

The scanning field 552 refers to indicators such as the type of scanning used to create, and therefore needed to decode, the image program. There are two main types of scanning: progressive scanning and interlaced scanning. Both refer to how image frames are updated. In progressive scanning, pixels are rendered in sequence, row by row. In interlace scanning, pixels are rendered in an every other row format. Accordingly, pixels in each even row may be rendered, followed by pixels in each odd row. The chroma sampling field 556 refers to an indicator as to how color components are sampled in color components YCrCb. Chroma sampling formats include 4:4:4, 4:4:2, and 4:2:0. Entries in the scanning field 552 and the chroma sampling field 556 are significant for projector compatibility reasons. Certain projectors may only be able to process programs scanned or chroma sampled in particular ways.

FIG. 6 illustrates additional ratings field 608 that indicate the rating indicator of the program in different jurisdictions. Accordingly, a theatre operator may select the rating for a given program, and thereby affect the ratings compatibility function, based on jurisdiction.

FIG. 6 also illustrates a milestone field 612. The milestone field 612 may comprise a description field 616 and a time code field 620. The description field 616 allows for a easily understood reference that corresponds to a given time. The time code field 620 indicates the time at which the milestone described in the description field 616 occurs. Generally, milestones refer to content related events. Milestones may be points of interest that occur in a feature or trailer, and is a label of the point of interest that occurs at a particular time. It is possible to specify that a cue occur at some specified time before or after the milestone. Examples of points of interest include opening of credits, start of closing credits, special effects, closing credits going to black, or closing credits on black. Frequently, the closing credits may start coming over the screen and then, at some sudden point, the background will go black and the viewer is able to view the rest of the detailed credits. Functionally, operation of a milestone is similar to that of a cue. That is, a trigger is sent to the theatre operating system to initiate some environmental control at the times indicated.

Figure 7:
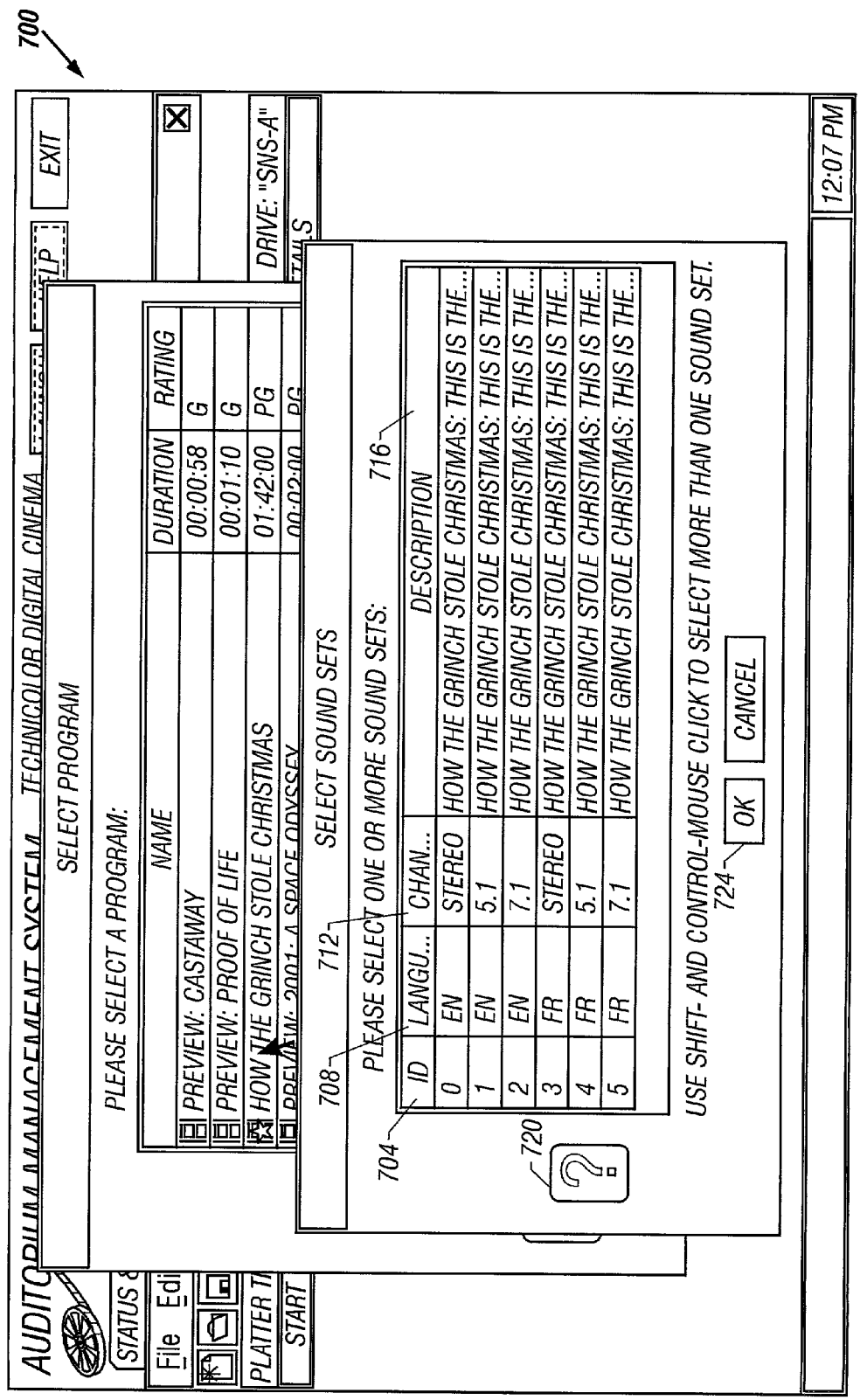
FIG. 7 illustrates a window showing available audio programs for a selected image program.

FIG. 7 illustrates a display of an audio programs select menu window 700. In FIG. 7, the audio select menu is limited to audio programs available for a particular selected image program. Such a limitation minimizes error when building a playlist. However, this may be configurable to allow for any audio program to be selected with any image program. In the example of FIG. 7, the image program "How the Grinch Stole Christmas" was selected. The selection of "How the Grinch Stole Christmas" image program initiated the window of potential audio programs 700. The audio programs window may comprise of a number of fields, such as an identification field 704, a language field 708, an audio channel field 712, and a description field 716. The identification field 704 is a unique identifier for a given audio program. The language field 708 indicates the language of the particular audio program. The channel field 712 indicates the sound format of the particular audio program. In an embodiment, the sound formats available are compatible with the Society of Motion Picture and Television Engineer (SMPTE) standard 323M. SMPTE standard 322M describes standard channel type assignments. For example, sound format 5.1 supports left, right, center, left surround, right surround, subwoofer, mono surround, left total, and right total audio outputs.

In another embodiment, a ratings indicator may be associated with each audio program. Certain audio programs originally created for mature audiences may be "toned down" to become more appropriate for younger audiences. Accordingly, more than one audio program of the same audio format may be available.

The description field 716 indicates a description of the audio program. In addition, a help button 720 is also available to assist a user in selection of audio programs. Upon selection of an "OK" button 724, the selected audio program is linked to the selected image program. Upon playback, linking allows the display of the image program and the audio program to be synchronized. The process of linking the two programs is transparent to the user.

Figure 8:
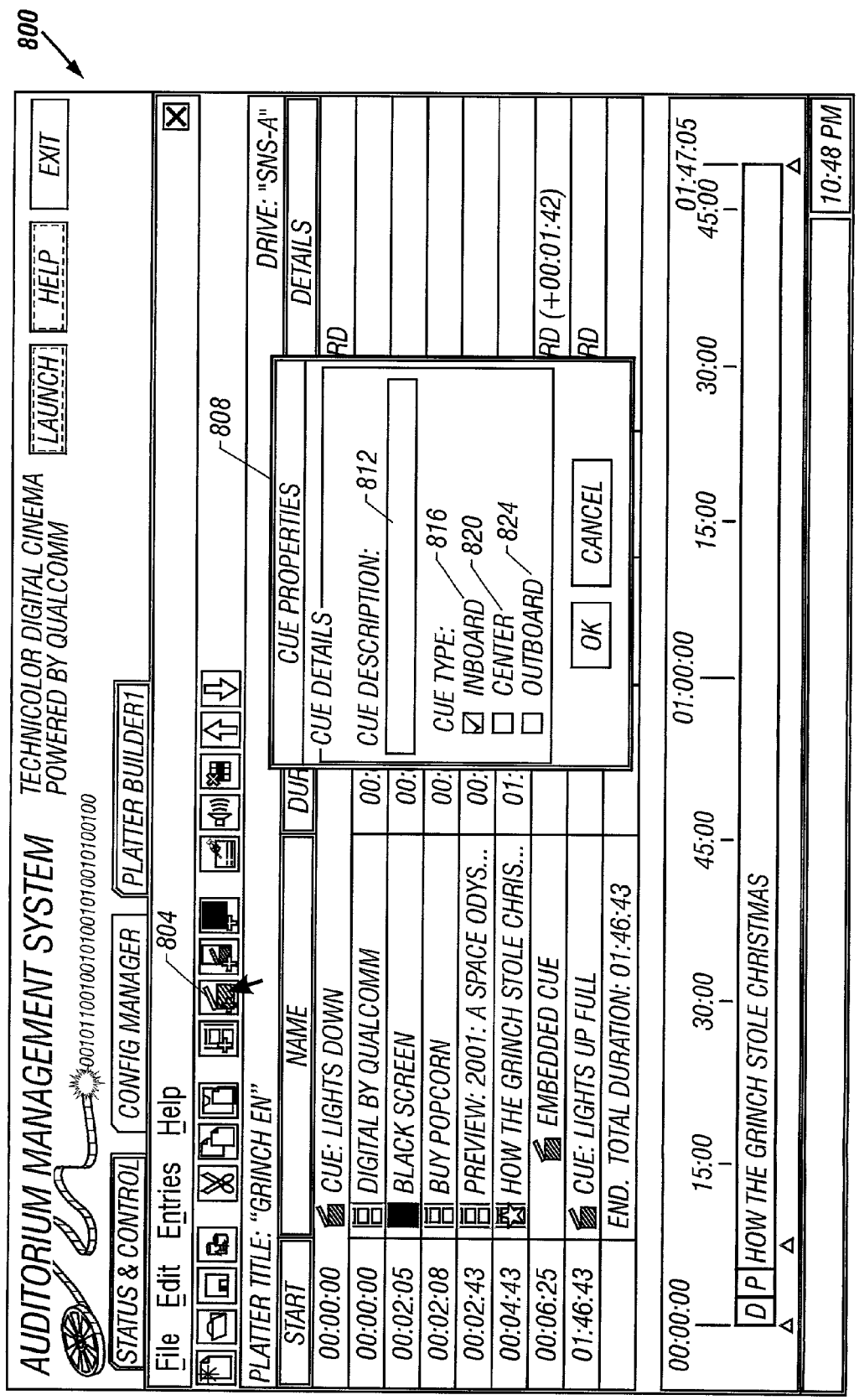
FIG. 8 illustrates a window showing selecting or creating a cue.

FIG. 8 illustrates a window of selecting or creating a cue insert 800. It is an aspect of an embodiment to allow for convenient and accurate input of cues. Further, it is another aspect to allow cues to be referenced by events, instead of merely being referenced by time. In an embodiment, if a user wants to insert a cue, the user clicks on the cue icon button 804 that initiates a cue properties window 808. The cue properties window 808 comprises a cue description field 812 and several fields to indicate the cue type: an inboard cue 816, a center cue 820, and an outboard cue 824. The selection of various combinations of inboard 816, center 820, and outboard 824 may be thought of as a three bit system indicating to the theatre automation system the type of cue to be inserted. Certain theatre automation systems attach meaning to the combinations of cues and thus behave differently based on the combination of the inboard cue 816, center cue 820, and outboard cue 824. In other words, selecting different combinations of inboard 816, center 820, and outboard 824 imply different functions to different theatre automation systems. Accordingly, selection of cues emulates input commands to theatre automation systems.

Figure 9:
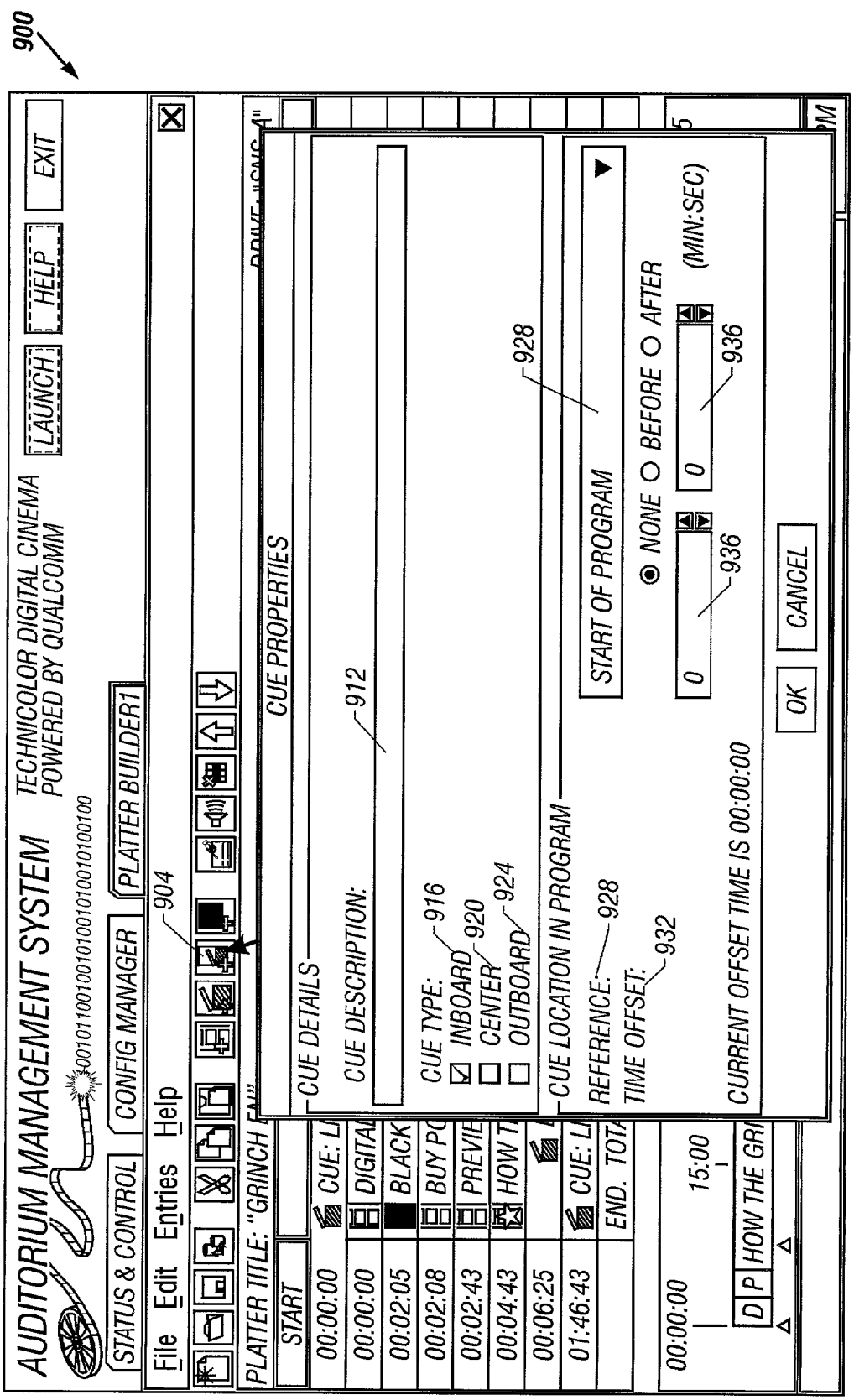
FIG. 9 illustrates a window showing selecting or creating an offset cue.

FIG. 9 illustrates a display screen of selecting or creating an offset cue insert 900. In an embodiment, upon selection of an offset cue icon 904 the cue properties window 908 for an offset cue insert is initiated. The offset cue window 908 may comprise of a number of fields, including a cue description field 912, an inboard cue 916, a center cue 920, and an outboard cue 924. The cue properties window 908 also allows a user to select a reference point 928 from which an offset cue insert is triggered. In an embodiment, milestones are used as the list of reference points. A reference point, for example, may be start of program, as illustrated in FIG. 9. The user may then select a time offset 932 as being none, before, or after, and input a number of minutes and seconds in minutes:seconds field 936 from which the cue will be offset.

An offset cue insert may be placed anywhere within a program of the playlist that the theatre operator desires. For example, an offset cue may initiate a special effect to occur within a certain time period of a function in a movie. For example, if a scene in a movie has a rocket launch at time 1 hour 26 minutes 32 seconds, the operator may want to have a special effect, such as wind, to occur 5 seconds after the time of the rocket launch. Accordingly, the user would select a reference point in field 928 to be rocket launch, and select the after box in the time offset field. The user may then insert "0:5" in the minute:seconds field for the effect of wind to occur 5 seconds after the launch of the rocket. Internally, the time of "rocket launch" from the start of the program is known. Thus, the inserting an offset of five seconds (0:5 in field 936) may actually be interpreted as 1 hour, 26 minutes 37 seconds from start of program.

During playback, when a cue is triggered, an electrical signal is sent through a relay card to an existing theatre automation system. In an embodiment, the auditorium manager allows for configuration of the relay card to operate with a plurality of theatre automation systems. The auditorium manager also allows for a user configurable signal, based on requirements of the theatre automation system.

Figure 10:
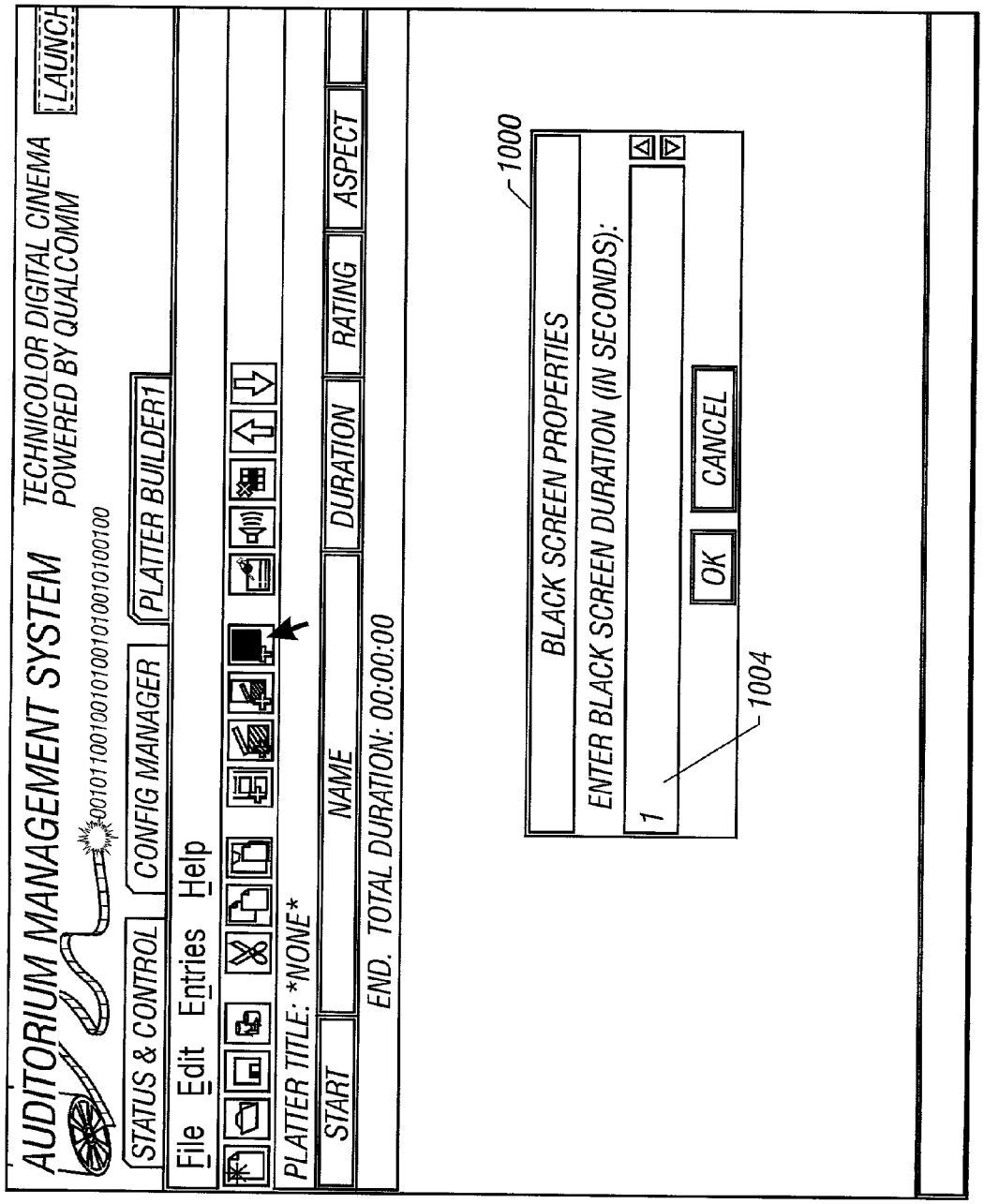
FIG. 10 illustrates a window showing a black screen.

FIG. 10 illustrates a black screen properties window 1000. It is an aspect of an embodiment to allow for convenient and accurate creation of a black screen insert. To display a black screen for a period of time, the user simply inputs the number of seconds desired in black screen duration field 804. A black screen insert entry is created in the playlist in the same manner as any image program or cue. In an embodiment, a black screen command in the playlist is interpreted in the decoder upon playback. Thus, the decoder plays plain black screen for n number of seconds as defined in the black screen duration field 1004. This is advantageous in that, unlike cues, no interaction with existing theatre automation systems is necessary.

Figure 11:
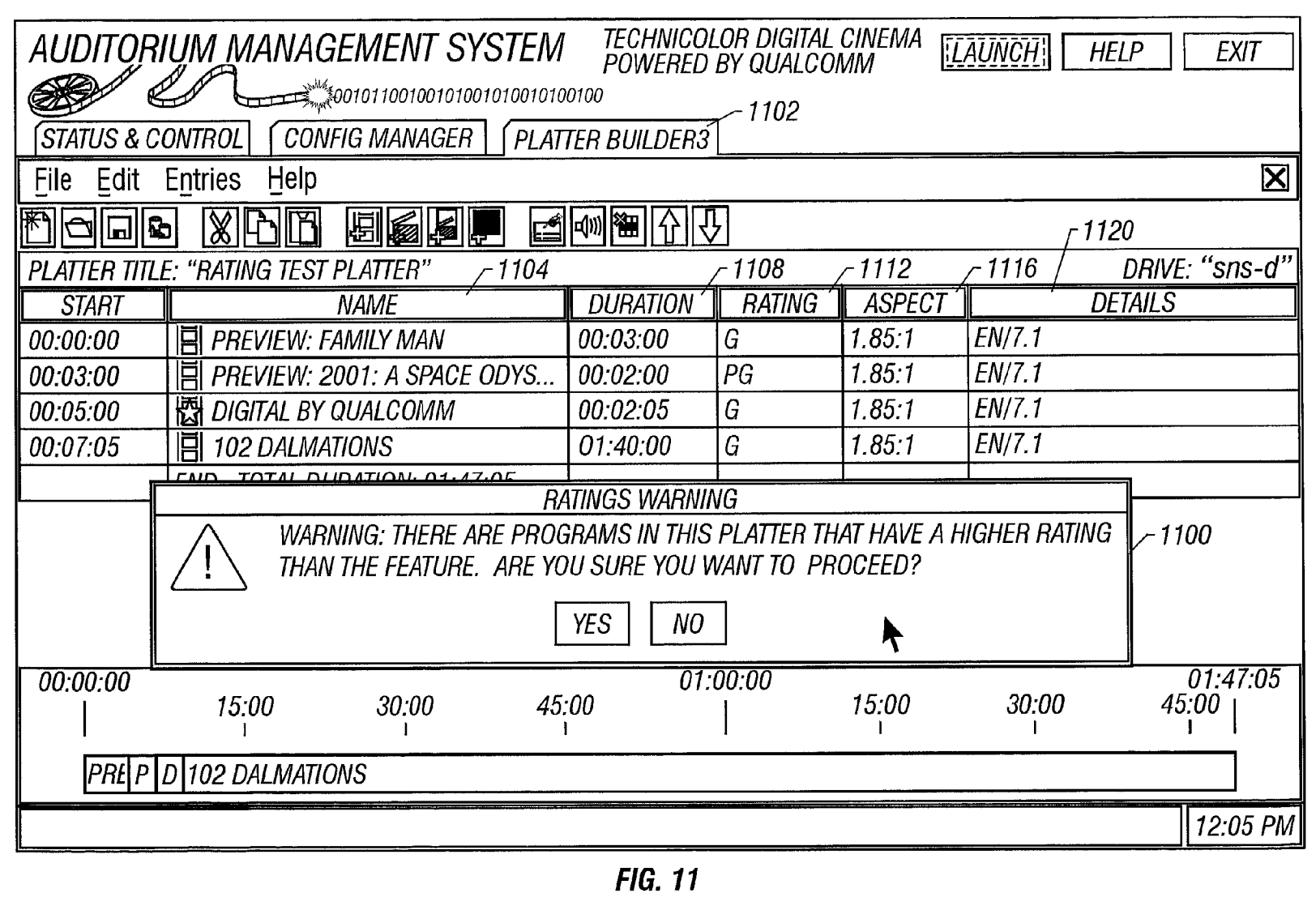

FIG. 11 illustrates a display issuing a warning indicative of incompatibility 1100 due to a ratings mismatch. Because the human element has been removed from the process of building a playlist, errors due to incompatibility of and between image programs, audio programs and projectors is minimized. As illustrated in FIG. 11, the platterbuilder3 window 1102 comprises a name field 1104, a duration field 1108, a rating field 1112, an aspect ratio field 1116, and a details field 1120. The details field 1120 contains information such as the language of the audio program associated with the image program and the sound format. If any of the programs selected in the platter have a mismatch, the warning window 1100 is displayed. For example, as illustrated in FIG. 11, the rating for "Preview: 2001: A Space Odyssey" is rated PG, while the remainder of the programs have a rating of G. Accordingly, the warning window 1100 shows an incompatibility of the ratings field. Similarly, warnings with respect to aspect ratio, language, sound format, or projector compatibility may also be issued.

Further, it will be apparent to those skilled in the art that any level of warning may be issued to the user, including not allowing the user to complete building a platter due to certain mismatches. For example, a warning may be sufficient when a PG program is in the same platter as G programs. However, if an image program with a rating of X is intermixed with other programs with the rating of G, the warning may be changed to an absolute prohibition of building such a platter. Similarly, absolute prohibitions may be issued for language incompatibility, language incompatibility, or aspect ratio incompatibility.

In an embodiment, each rating is assigned a numerical value that is compared in software to determine if a ratings mismatch occurred. For example, a value of 10 may be given to a rating of G, and a value of 20 may be given to a rating of PG. Therefore, an apparatus or method may simply compare ratings by comparing numerical values.

Similarly, international ratings may be handled in the same manner. A warning may also be issued if a rating for one program is of a given jurisdiction and a rating of another program is of another jurisdiction. Further, comparisons may be made as to the ratings in different jurisdictions based on the underlying rationale for a rating in a given jurisdiction.

Figure 12:
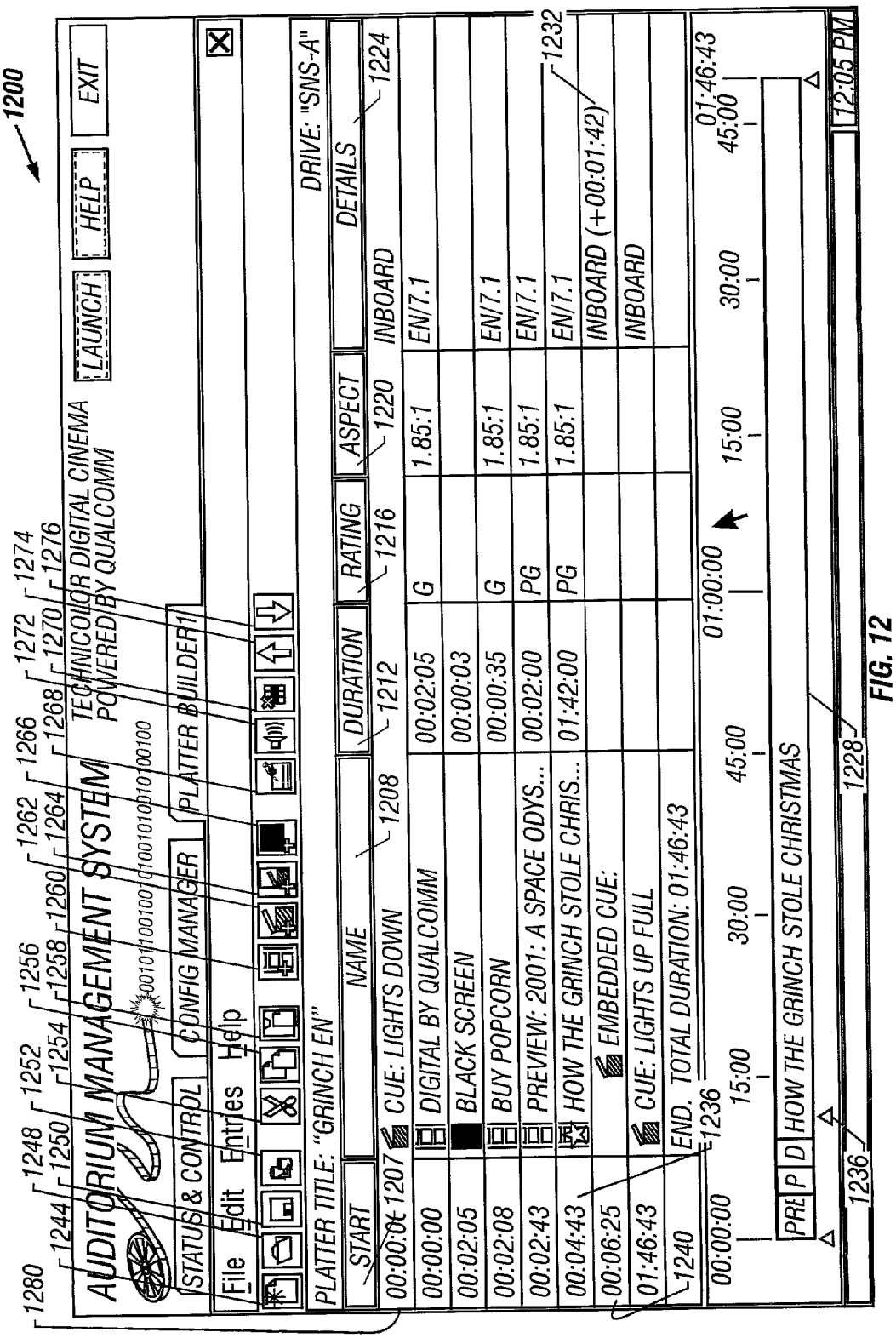
FIG. 12 illustrates a window showing a created playlist.

FIG. 12 illustrates a window 1200 of a created playlist. The playlist 1200 shows a start time field 1204, a name field 1208, a duration field 1212, a rating field 1216, an aspect ratio field 1220, a details field 1224, and a time elapsed bar 1228. The start time field 1204 indicates the running time that a particular cue occurs or an image program is displayed. The details field 1224 indicates, for cues, the type of cue selected (inboard, center, outboard) and, for programs, the language and sound format selected. An example of an embedded cue is illustrated in box 1232. An inboard cue is set to occur 1 minute and 42 seconds after the 4 minute and 43 second mark. As the program "How the Grinch Stole Christmas" is being played, starting at the 4 minute 43 second mark, a signal for the embedded cue is triggered 1 minute and 42 seconds later, or at the 6 minute 25 second mark (box 1236) and sent to the theatre automation system.

In FIG. 12, the time elapsed bar 1228 is illustrated toward the bottom of the display. The time elapsed bar 1228 indicates which program is being played at a given time and the sequence of events to occur from the beginning to the end of the platter. If the user selects a pointer, such as pointer 1236, the program corresponding to the pointer will highlight. Accordingly, if a user selects pointer 1236 (for example, by using a mouse), row 1240 reflecting "How the Grinch Stole Christmas" will highlight. Similarly, if row 1240 is highlighted, point 1236 may also be highlighted.

FIG. 12 also illustrates a number of user selectable icons, such as a new platter icon 1244, a select platter icon 1248, a save platter icon 1250, a work on another drive icon 1252, a cut icon 1254, a copy icon 1256, a paste icon 1258, a select program icon 1260 (described in detail with respect to FIG.4), a add cue icon 1262 (described in detail with respect to FIG. 8), a add embedded cue icon 1264 (described in detail with respect to FIG. 9), a add black screen icon 1266 (described in detail with respect to FIG. 10), a detailed properties icon 1268 (described in detail with respect to FIGS.5 and 6), a delete entry icon 1270, a select sound sets 1272 (described in detail with respect to FIG. 7), an up-arrow icon 1274 and a down-arrow icon 1276.

The up-arrow icon 1274 and the down-arrow icon 1276 allow a user to easily and quickly arrange selected programs, black screens and cues. If a user selects, for example, the down-arrow icon 1276 and has the "cue lights down" row 1280 highlighted, the user may sequence the highlighted column by using the arrow keys of a keyboard, or clicking and dragging with a mouse, or any other user input device. Thus, selected programs and cues may be easily sequenced to occur in any order the user desires.

The start time 1204 associated with programs or cues adjust accordingly. In the case of an embedded cue, the embedded cue (as illustrated in box 1232) is linked to its corresponding program. For example, the embedded cue in box 1232 is linked to the program "How the Grinch Stole Christmas." If the user highlights the column for the program "How the Grinch Stole Christmas," and wishes to resequence it, the embedded cue will automatically be resequenced with that program. The start time fields 1204 will adjust for each entry accordingly.

FIG. 12 also illustrates an insert cue icon 1262. In an embodiment, as opposed to having a drop-down menu of a selection of types of cues, the user may optionally select the input cue icon to select a given cue, or define its own cue.

As used herein, image programs comprise encoded image information, and may comprise a number of image files. Similarly, audio programs comprise encoded audio information, and soundtracks and may comprise a number of audio files. Accordingly, it is recognized that image programs and audio programs may be combined or subdivided into groups of encoded data in any number of manageable image files and audio files.

As examples, the various illustrative logical blocks, flowcharts, windows, and steps described in connection with the embodiments disclosed herein may be implemented or performed in hardware or software with an application-specific integrated circuit (ASIC), a programmable logic device, discrete gate or transistor logic, discrete hardware components, such as, e.g., registers and FIFO, a processor executing a set of firmware instructions, any conventional programmable software and a processor, or any combination thereof. The processor may advantageously be a microprocessor, but in the alternative, the processor may be any conventional processor, controller, microcontroller, or state machine. The software could reside in RAM memory, flash memory, ROM memory, registers, hard disk, a removable disk, a CD-ROM, a DVD-ROM or any other form of storage medium known in the art.

The previous description of the preferred embodiments is provided to enable any person skilled in the art to make or use the present invention. The various modifications to these embodiments will be ready apparent to those skilled in the art, and the generic principles to find herein may be applied to other embodiments without the use of inventive faculty. Thus, the present invention is not intended to be limited to the embodiments shown herein but is to be accorded the widest scope consistent with the principles and novel features disclosed herein.

What is claimed is:

1. In a digital cinema system, a method for creating a playlist, the method comprising the steps of:
    displaying a list of program titles;
    receiving an input for selecting a program title from said list;
    displaying a list of available audio programs corresponding to said selected program title;
    receiving another input for selecting an audio program from said list; and,
    performing an automated compatibility process to verify the compatibility of the selected program title and the selected audio program, so as to prevent an actual creation of a playlist formed from the selected program title and the selected audio program if the compatibility does not exist.

2. The method as set forth in claim 1, further comprising: linking the specified audio program to the specified image program to form a selected program.

3. The method as set forth in claim 2, further comprising: sequencing the selected programs in the order which presentation is desired.

4. The method as set forth in claim 2, further comprising: specifying an insert from the group consisting of at least one of the following: a cue, an embedded cue, and a black screen; and sequencing the selected programs and inserts in the order which presentation is desired.

5. The method as set forth in claim 1, wherein the step of selecting audio programs is limited to a subset of audio programs, each subset of audio programs being based on each image program selected.

6. The method as set forth in claim 2, wherein each image program has an associated indicator, the step of verifying further comprising: comparing the indicator from the group consisting of at least one of the following: a ratings indicator, an aspect ratio indicator, a scanning indicator, and a chroma sampling indicator; and displaying a warning indicative of incompatibility.

7. The method as set forth in claim 2, wherein each audio program has an associated indicator, the step of verifying further comprising: comparing the indicator from the group consisting of at least one of the following: a language indicator, an audio format indicator and a ratings indicator; and displaying a warning indicative of incompatibility.

8. The method as set forth in claim 2, wherein each image program has a projector lens indicator, the step of verifying further comprising: comparing the projector lens indicator of each image program; and displaying a warning indicative of projector incompatibility.

9. The method as set forth in claim 2 further comprising: displaying a warning if the same image program or the same audio program is selected more than once.

10. The method as set forth in claim 4, wherein sequencing further comprises using a user input device to move an entry corresponding to the image program to a different position relative to the other displayed image programs.

11. The method as set forth in claim 2, further comprising: scheduling the selected programs to be presented at a specified time.

12. The method as set forth in claim 2, further comprising scheduling the selected programs to be presented in a specified auditorium.

13. In a digital cinema system, a method for creating a playlist, the method comprising: displaying at least one list of image program titles, each image program title representing encoded data representing image information; responsive to an image program title being selected, displaying at least one list of corresponding audio programs, each corresponding audio program representing encoded data representing audio information; and responsive to an audio program being selected, performing an automated compatibility process to verify the compatibility of the selected image program title with the selected audio program, so as to prevent an actual creation of a playlist formed from the selected image program title and the selected audio program if the compatibility does not exist.

14. The method as set forth in claim 13, further comprising: linking the specified audio program to the specified image program to form a selected program.

15. The method as set forth in claim 14, further comprising: sequencing the selected programs in the order which presentation is desired.

16. The method as set forth in claim 14, further comprising: specifying an insert from the group consisting of at least one of the following: a cue, an embedded cue, and a black screen; and sequencing the selected programs and inserts in the order which presentation is desired.

17. The method as set forth in claim 14, wherein each image program has an associated indicator, the step of verifying further comprising: comparing the indicator from the group consisting of at least one of the following: a ratings indicator, an aspect ratio indicator, a scanning indicator, and a chroma sampling indicator; and displaying a warning indicative of incompatibility.

18. The method as set forth in claim 14, wherein each audio program has an associated indicator, the step of verifying further comprising: comparing the indicator from the group consisting of at least one of the following: a language indicator, an audio format indicator and a ratings indicator; and displaying a warning indicative of incompatibility.

19. The method as set forth in claim 14, wherein each image program has a projector lens indicator, the step of verifying further comprising: comparing the projector lens indicator of each image program; and displaying a warning indicative of projector incompatibility.

20. The method as set forth in claim 14 further comprising: displaying a warning if the same image program or the same audio program is selected more than once.

21. The method as set forth in claim 16, wherein resequencing further comprises using a user input device to move an entry corresponding to the image program to a different position relative to the other displayed image programs.

22. The method as set forth in claim 14, further comprising scheduling the selected programs to be presented at a specified time.

23. The method as set forth in claim 14, further comprising scheduling the selected programs to be presented in a specified auditorium.

24. In a digital cinema system, an apparatus configured to create a playlist, the apparatus comprising: means for displaying at least one list of image program titles, each image program title representing encoded data representing image information; responsive to an image program title being selected, means for displaying at least one list of corresponding audio programs, each audio program representing encoded data representing audio information; and responsive to an audio program being selected, means for performing an automated compatibility process to verify the compatibility of the selected image program title with the selected audio program, so as to prevent an actual creation of a playlist formed from the selected image program title and the selected audio program if the compatibility does not exist.

25. The apparatus as set forth in claim 24, further comprising: means for linking the specified audio program to the specified image program to form a selected program.

26. The apparatus as set forth in claim 25, further comprising: means for sequencing the selected programs in the order which presentation is desired.

27. The apparatus as set forth in claim 25, further comprising: means for specifying an insert from the group consisting of at least one of the following: a cue, an embedded cue, and a black screen; and means for sequencing the selected programs and inserts in the order which presentation is desired.

28. The apparatus as set forth in claim 25, wherein each image program has an associated indicator, the means for verifying further comprising: means for comparing the indicator from the group consisting of at least one of the following: a ratings indicator, an aspect ratio indicator, a scanning indicator, and a chroma sampling indicator; and means for displaying a warning indicative of incompatibility.

29. The apparatus as set forth in claim 25, wherein each audio program has an associated indicator, the means for verifying further comprising: means for comparing the indicator from the group consisting of at least one of the following: a language indicator, an audio format indicator and a ratings indicator; and means for displaying a warning indicative of incompatibility.

30. The apparatus as set forth in claim 25, wherein each image program has a projector lens indicator, the means for verifying further comprising: means for comparing the projector lens indicator of each image program; and means for displaying a warning indicative of projector incompatibility.

31. The apparatus as set forth in claim 25 further comprising: means for displaying a warning if the same image program or the same audio program is selected more than once.

32. The apparatus as set forth in claim 26, wherein the means for sequencing further comprises means for moving an entry corresponding to the image program to a different position relative to the other displayed image programs.

33. The apparatus as set forth in claim 25, further comprising means for scheduling the selected programs to be presented at a specified time.

34. The apparatus as set forth in claim 25, further comprising means for scheduling the selected programs to be presented in a specified auditorium.

35. In a digital cinema system, a theatre manager apparatus comprising: a playlist builder configured to build a playlist comprising image and audio programs based upon selected displayed image program titles and selected corresponding displayed audio programs; and an automated compatibility checker electrically connected to the playlist builder, the compatibility checker configured to verify compatibility of the selected image and audio programs, so as to prevent an actual creation of a playlist formed from the selected image and the selected audio programs if the compatibility does not exist.

36. The apparatus of claim 35, wherein the playlist further comprises cues.

37. The apparatus of claim 36, wherein the playlist further comprises embedded cues.

38. The apparatus of claim 35, wherein the playlist further comprises black screens.

39. The apparatus of claim 35, further comprising a scheduler electrically connected to the playlist builder, wherein the scheduler is configured to schedule the verified playlist for presentation at a specified time and place.

40. The apparatus as set forth in claim 35, wherein the playlist builder further comprises a sequencer, wherein the sequencer is configured to sequence selected programs in the order in which presentation is desired.

41. The apparatus as set forth in claim 35, wherein each image program has an associated indicator, the compatibility checker further comprising: a verifier configured to compare the indicator from the group consisting of at least one of the following: a ratings indicator, an aspect ratio indicator, a scanning indicator, and a chroma sampling indicator.

42. The apparatus as set forth in claim 35, wherein each audio program has an associated indicator, the compatibility checker further comprising: a verifier configured to compare the indicator from the group consisting of at least one of the following: a language indicator, an audio format indicator and a ratings indicator.

43. The apparatus as set forth in claim 35, wherein each image program has a projector lens indicator, the compatibility checker further comprising: a verifier configured to compare the projector lens indicator of each image program.

44. In a digital cinema system, a method for creating a playlist, the method comprising: displaying at least one list of image programs, each image program representing encoded data representing image information; responsive to an image program being selected from said list, displaying at least one corresponding audio program, each corresponding audio program representing encoded data representing audio information; and responsive to an audio program being selected, performing an automated compatibility process to verify the compatibility of the selected image program with the selected audio program, so as to prevent an actual creation of a playlist formed from the selected image program and the selected audio program if the compatibility does not exist, wherein each image program and each audio program of said lists includes an indicator, wherein the step of verifying further comprises: upon verification, linking the specified audio program to the specified image program to form a selected program; specifying an insert from the group consisting of at least one of the following: a cue, an embedded cue, and a black screen; and sequencing the selected programs and inserts in the order which presentation is desired.

45. In a digital cinema system, a method for creating a playlist, the method comprising: displaying at least one program title list, each program title of said list representing image information; responsive to an program title being selected, displaying at least one audio program list, each audio program of said list representing audio information; and responsive to an audio program being selected, performing an automated compatibility process to verify the compatibility of the selected program title with the selected audio program, so as to prevent an actual creation of a playlist formed from the selected program title and the selected audio program if the compatibility does not exist, wherein each program title and each audio program includes an indicator, wherein the step of verifying further comprises: comparing the indicator to an indicator from the group consisting of at least one of the following: a ratings indicator, an aspect ratio indicator, a scanning indicator, and a chroma sampling indicator a language indicator, an audio format indicator and a ratings indicator; and displaying a warning indicative of incompatibility; upon verification, linking the specified audio program to the specified image program to form a selected program; specifying an insert from the group consisting of at least one of the following: a cue, an embedded cue, and a black screen; and sequencing the selected programs and inserts in the order which presentation is desired.

46. In a digital cinema system, a theatre manager apparatus comprising: a playlist builder configured to build a playlist comprising image and audio programs, cues and black screens based upon at least one displayed list of image program titles and corresponding audio programs and an automated compatibility checker electrically connected to the playlist builder, the compatibility checker configured to perform an automated compatibility process to verify compatibility of the image and audio programs so as to prevent an actual creation of a playlist formed from the image and audio programs if the compatibility does not exist; a sequencer, wherein the sequencer is configured to sequence selected programs in the order in which presentation is desired; and a scheduler electrically connected to the playlist builder, wherein the scheduler is configured to schedule the verified playlist for presentation at a specified time and place.

47. In a digital cinema system, a theatre manager apparatus comprising: a playlist builder configured to build a playlist comprising image and audio programs, cues and black screens based upon at least one displayed list, said displayed list comprising program titles and corresponding audio programs, each image title and audio program including a first indicator; an automated compatibility checker electrically connected to the playlist builder, the compatibility checker configured to perform an automated compatibility process to verify compatibility of the image and audio programs so as to prevent an actual creation of a playlist formed from the image and audio programs if the compatibility does not exist, the compatibility checker performing the automated compatibility process by comparing the first indicator to a second indicator selected from the group consisting of at least one of the following: a ratings indicator, an aspect ratio indicator, a scanning indicator, and a chroma sampling indicator, a language indicator, an audio format indicator and a ratings indicator, and upon verification, create a selected program; the playlist builder further comprising a sequencer, wherein the sequencer is configured to sequence selected programs, cues and black screens in the order in which presentation is desired; and a scheduler electrically connected to the playlist builder, wherein the scheduler is configured to schedule the verified playlist for presentation at a specified time and place.

48. A computer readable medium containing instructions for controlling a computer system to perform a method, the method comprising: displaying at least one image program title and at least one corresponding audio program, each image program title representing image information, each audio program representing audio information; and performing an automated compatibility process to verify the compatibility of the selected image programs titles with the selected corresponding audio programs, so as to prevent an actual creation of a playlist formed from the selected image programs titles and the selected corresponding audio programs if the compatibility does not exist.

49. The method as set forth in claim 48, further comprising: linking the specified audio program to the specified image program to form a selected program; and sequencing the selected programs in the order which presentation is desired.

50. The method as set forth in claim 49, further comprising: specifying an insert from the group consisting of at least one of the following: a cue, an embedded cue, and a black screen; and sequencing the selected programs and inserts in the order which presentation is desired.

51. The method as set forth in claim 48, wherein the step of selecting audio programs is limited to a subset of audio programs, each subset of audio programs being based on each image program selected.

52. The method as set forth in claim 49, wherein each image program has an associated indicator, verifying further comprising: comparing the indicator from the group consisting of at least one of the following: a ratings indicator, an aspect ratio indicator, a scanning indicator, and a chroma sampling indicator; and displaying a warning indicative of incompatibility.

53. The method as set forth in claim 49, wherein each audio program has an associated indicator, the step of verifying further comprising: comparing the indicator from the group consisting of at least one of the following: a language indicator, an audio format indicator and a ratings indicator; and displaying a warning indicative of incompatibility.

54. The method as set forth in claim 49, wherein each image program has a projector lens indicator, the step of verifying further comprising: comparing the projector lens indicator of each image program; and displaying a warning indicative of projector incompatibility.

* * * * *